3,160,645
METHOD OF PREPARING DIALKYL ESTERS OF SULFOFATTY ACIDS
Eugene J. Miller, Jr., Carol Stream, Wheaton, Ill., assignor to Armour and Company, Chicago, Ill., a corporation of Delaware
No Drawing. Filed Dec. 19, 1960, Ser. No. 76,519
11 Claims. (Cl. 260—400)

This invention relates to a new chemical compound and a process for the preparation thereof.

I have now discovered, as new and useful chemical compositions, the dialkyl esters of sulfofatty acids. These compounds may be used as plasticizer, and as flotation and flocculation agents for minerals.

Included within the scope of these dialkyl esters of sulfofatty acids are preferred compounds having the general formula,

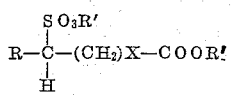

wherein R is a radical selected from the group consisting of a hydrogen atom and an aliphatic hydrocarbon radical having from about 8 to 22 carbon atoms, R' is an aliphatic hydrocarbon radical having from about 2 to 16 carbon atoms, and X is an integer ranging from 0 to about 22, provided that the total of the integer represented by the letter X and the number of carbon atoms in the radical R does not exceed about 22.

Examples of aliphatic hydrocarbon radicals coming within the meaning of R are octyl, nonyl, decyl, undecyl, dodecyl, tridecyl, tetradecyl, tetradecenyl, pentadecyl, hexadecyl, hexadecenyl, heptadecyl, octadecyl, octadecenyl, octadecadienyl, octadecatrienyl, nonadecyl, eicosyl, heneicosyl, and docosyl. Generally the aliphatic hydrocarbon radical represented by R has from about 12 to 18 carbon atoms.

Examples of aliphatic hydrocarbon radicals coming within the meaning of R' are ethyl, propyl, butyl, pentyl, hexyl, heptyl, octyl, nonyl, decyl, undecyl, dodecyl, tridecyl, tetradecyl, pentadecyl, and hexadecyl. Generally, the number of carbon atoms in the radical R' will range from about 2 to 8.

The value of the integer represented by the letter X determines the position of the radical, (—SO₃R'), in the compound. For example, if X is 0, this radical will be in the alpha position; if X is 1, the radical will then be in the beta position, etc. As pointed out in the description of the general formula, the total of the number of carbon atoms in the radical R and the integer represented by the letter X ordinarily will not exceed about 22. Generally, the integer represented by the letter X will range from 0 to about 6. Preferably, this radical is in the alpha position. When this radical is in the alpha position, the new compound is a dialkyl ester of alpha-sulfofatty acids.

I have discovered a process useful in the preparation of these dialkyl esters of sulfofatty acids. Generally, the process comprises reacting a sulfofatty acid with an olefin in the presence of a suitable catalyst, and recovering the ester.

Included within the meaning of the sulfofatty acids used in the process are preferred compounds having the general formula,

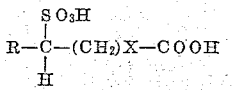

in which R and X are as previously described.

Examples of olefins which may be used in the process are ethylene, propylene, butylene, amylene, hexylene, heptylene, octylene, nonylene, decylene, undecylene, dodecylene, tridecylene, tetradecylene and hexadecylene. I prefer to utilize olefins in which the number of carbon atoms ranges from about 2 to 8. Generally, good results are obtained when an excess of olefin is used. If 2 moles or more of olefin per mole of sulfofatty acid is utilized, there is an excellent yield.

Any suitable catalyst may be used in the process. Boron trifluoride is a particularly satisfactory catalyst. Also, boron trifluoride diethyl etherate has been found to be a good catalyst. Ordinarily, satisfactory results are obtained if at least 0.4 mole of catalyst per mole of sulfofatty acid is utilized. It is preferred that from about 0.5 to 1.0 mole of catalyst per mole of sulfofatty acid be utilized. Particularly excellent results are obtained when 0.52 mole of catalyst per mole of sulfofatty acid is used.

The process also works in the presence of a solvent, such as, carbon tetrachloride or methylene chloride. When a solvent is present during the process, good results are obtained when 0.5 mole of catalyst per mole of sulfofatty acid is utilized, but, it is preferable that the molar ratio of catalyst to sulfofatty acid be at least 1 to 1.

Pressures used in the process may vary greatly and suitably may range from about 1 to 80 atmospheres. Good results have been obtained at atmospheric pressure especially when octylene or other higher olefins are utilized. When lower olefins are utilized, better results are obtained at higher pressures. For example, excellent results have been obtained when using ethylene in the 500 to 600 p.s.i. range or when utilizing propylene in the 15 to 25 p.s.i. range.

Temperatures may also vary greatly and suitably may range from about 0 to 80° C. When lower olefins, such as ethylene and propylene are utilized, it is preferred that the temperature be from about 10° to 50° C. When some of the higher olefins such as octylene are used, higher temperatures are preferred.

The reaction starts immediately and a demonstratable yield may be obtained after approximately one-half hour but better yields are usually obtained after longer periods of time. When lower olefins, such as ethylene and propylene are utilized, excellent results are obtained in the time range of from about 4 to 8 hours. Longer periods are preferred when using higher olefins. For example, when octylene is utilized, 20 hours of reaction time gives good results.

A typical reaction, which takes place during the process, may be illustrated by the following, when an alpha-sulfofatty acid is reacted with ethylene in the presence of a catalyst, preferably boron trifluoride,

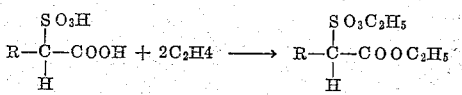

Another typical reaction, when propylene is reacted with alpha-sulfofatty acid in the presence of a catalyst, may be illustrated by the following,

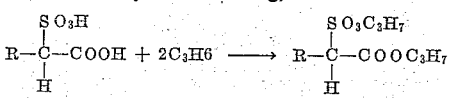

Standard laboratory procedures may be utilized for recovering the esters from the unreacted acid. A particularly satisfactory method for obtaining the esters is to dissolve the solution in Skellysolve F, wash with 50% aqueous methanol, and pass through a short column of activated alumina. Further purification is effected by low temperature crystallization from Skellysolve F.

The following examples more fully illustrate the invention, but it is not intended that the invention be limited to the exact procedures, compounds or conditions utilized in the examples. Rather it is intended that all equivalents to those skilled in the art be included within the scope of the invention.

*Example I*

The autoclave was charged with 168.2 grams (0.5 mole) of alpha-sulfopalmitic acid and gaseous $BF_3$ added to a pressure of 50 p.s.i. Ethylene was introduced into the bomb until a pressure of 600 p.s.i. was obtained. This pressure was maintained for 6 hours at 40° C. with stirring. The contents were then removed with Skellysolve F, washed thoroughly with 50% aqueous methanol, dried over anhydrous $Na_2SO_4$ and stripped of solvent to yield 177.4 grams (90.5% of theoretical) of crude diethyl-alpha-sulfopalmitate.

*Example II*

The autoclave was charged with 729.2 grams (2.0 moles) of alpha-sulfostearic acid and approximately 95 grams (90 p.s.i., 1.4 moles) of gaseous $BF_3$. Ethylene was introduced into the autoclave until a pressure of 600 p.s.i. gauge was obtained. This pressure was maintained for 7 hours at 32° C. with stirring. The contents were then removed with Skellysolve F, washed thoroughly with 50% aqueous methanol, dried over anhydrous $Na_2SO_4$ and stripped of solvent to yield 906.9 grams of crude ester. This crude ester is about 83% active (754 grams) for a 90% yield of diethyl-alpha-sulfostearate.

*Example III*

A one liter autoclave was charged with 168.2 grams (0.5 mole) of alpha-sulfopalmitic acid. Three-tenths of a mole (20.4 grams) of gaseous $BF_3$ was tared into the vessel. Ethylene was then introduced until a total pressure of 600 p.s.i. was obtained. This pressure was maintained for about 5 hours. The reaction is exothermic and the temperature rose to 40° C. and remained there throughout the reaction. This reaction mixture was removed with Skellysolve F, washed thoroughly with 50% aqueous methanol, dried over anhydrous $Na_2SO_4$ and stripped of solvent to yield 214 grams of crude diethylalpha-sulfopalmitate; 80% active, 95% conversion. Further purification can be effected by low temperature crystallization from Skellysolve F. This can be accomplished with about 75% recovery. Analysis after two crystallizations: Calculated—S.EQ., 196; A.V., 0. Found—S.EQ., 196; A.V., 1.

*Example IV*

A Parr hydrogenation shaker charged with 33.65 grams (0.1 mole) of alpha-sulfopalmitic acid and 150 ml. of methylene chloride. Gaseous $BF_3$ was charged to about 45 p.s.i. This pressure dropped to 0 p.s.i. gauge when the mixture was agitated. Propylene was then charged into the vessel to 20 p.s.i. gauge and maintained at that pressure for 3½ to 4 hours at 35° with agitation. The reaction mixture was worked up in the usual manner to yield 57.2 grams of crude diisopropyl-alpha-sulfopalmitate; 66% active, 90% conversion. Boron trifluoridediethyl etherate could also be used as a catalyst, but lower yields of diisopropyl-alpha-sulfopalmitate were obtained; 70% active, 54% conversion. Analysis after two crystallizations: Calculated—S.EQ., 210; A.V., 0. Found—S.EQ., 214; A.V., 2.

*Example V*

A Parr hydrogenation shaker was charged with 33.65 grams (0.1 mole) of alpha-sulfopalmitic acid, 44.2 grams (0.39 mole) of commercial 1-octene and 200 grams of methylene chloride. Gaseous $BF_3$ was then bubbled in until all the free acid dissolved in the reaction mixture. The solution thus obtained was agitated for 6 hours at 52° C. A yield of 42 grams of crude dioctyl-alpha-sulfopalmitate was obtained; 57% active, 43% conversion.

*Example VI*

The autoclave was charged with 980 g. (2.75 moles) of sulfonated hydrogenated tallow fatty acid (typical composition: myristic acid—2%; palmitic acid—29%; stearic acid—68%; oleic acid—1%) and 99 g. (1.46 moles) of gaseous $BF_3$. Ethylene was then introduced into the autoclave until a pressure of 600 p.s.i. was obtained. This pressure was maintained for 5 hours at 30° C. with stirring. The contents were removed with Skellysolve F, washed thoroughly with 50% aqueous methanol and dried over anhydrous NaSO. After three crystallizations for Skellysolve F, 750 g. of ester were obtained for a 66% yield. Analyses: Saponification equivalent—Calc., 205X. Found 206 acid value—calc. OX. Found 0.8.

Now that the invention has been described, I claim:

1. A method for preparing dialkyl esters of sulfofatty acids, comprising reacting a mono-sulfofatty acid having 8 to 22 carbon atoms with an olefin having from about 2 to 16 carbon atoms in the presence of a compound selected from the group consisting of boron trifluoride and boron trifluoride diethyletherate, and recovering the ester.

2. A method for preparing dialkyl esters of sulfofatty acids, comprising reacting a mono-sulfofatty acid having 8 to 22 carbon atoms with an excess of an olefin having from about 2 to 16 carbon atoms in the presence of at least 0.4 mole of a compound selected from the group consisting of boron trifluoride and boron trifluoride diethyletherate per mole of sulfofatty acid, and recovering the ester.

3. A method for preparing dialkyl esters of sulfofatty acids, comprising reacting a mono-sulfofatty acid having 8 to 22 carbon atoms with an excess of an olefin having from about 2 to 16 carbon atoms in the presence of at least 0.4 mole of boron trifluoride per mole of sulfofatty acid under pressures of from about 1 to 80 atmospheres, at temperatures of from about 0 to 80° C. for a period of at least ½ hour, and recovering the ester.

4. A method for preparing dialkyl esters of alpha-sulfofatty acids, comprising reacting an alpha-monosulfofatty acid having from 8 to 22 carbon atoms with an olefin having from about 2 to 16 carbon atoms in the presence of boron trifluoride, and recovering the ester.

5. A method for preparing dialkyl esters of alpha-sulfofatty acids, comprising reacting an alpha-sulfofatty acid having from 8 to 22 carbon atoms with an excess of an olefin having from about 2 to 8 carbon atoms, in the presence of at least 0.4 mole of boron trifluoride per mole of sulfofatty acid, and recovering the ester.

6. A method for preparing dialkyl esters of alpha-sulfofatty acids, comprising reacting an alpha-sulfofatty acid having from 8 to 22 carbon atoms with an olefin having from about 2 to 8 carbon atoms, the proportion of reactants being at least two moles of said olefin per mole of said acid, in the presence of at least 0.4 mole of boron trifluoride per mole of sulfofatty acid under pressures of from about 1 to 80 atmospheres, at temperatures of from about 0 to 80° C., for at least one-half hour, and recovering the ester.

7. A method for preparing dialkyl esters of alpha-sulfofatty acids, comprising reacting an alpha-sulfofatty acid having from 8 to 22 carbon atoms with an olefin having from about 2 to 3 carbon atoms, the proportion of reactants being at least two moles of said olefin per mole of said acid, in the presence of from about 0.5 to 1.0 mole of boron trifluoride per mole of sulfofatty acid under pressures from about 1 to 40 atmospheres, at temperatures from about 10 to 50° C., for a period from about 4 to 8 hours, and recovering the ester.

8. A method for preparing diethyl esters of alpha-sulfofatty acids, comprising reacting an alpha-sulfofatty acid having from 8 to 22 carbons with at least 2 moles of ethylene per mole of fatty acid in the presence of from about 0.5 to 1.0 mole of boron trifluoride per mole of sulfofatty acid under pressures from about 500 to 600 p.s.i., at temperatures from about 10 to 50° C., for a period of from about 4 to 8 hours, and recovering the ester.

9. A method for preparing dipropyl esters of alpha-sulfofatty acids, comprising reacting an alpha-sulfofatty acid having from 8 to 22 carbon atoms with at least 2 moles of propylene per mole of sulfofatty acid in the presence of from about 0.5 to 1.0 mole of boron trifluoride per mole of sulfofatty acid under pressures of from about 15 to 25 p.s.i., at temperatures of from about 10 to 50° C., for about 4 to 8 hours, and recovering the ester.

10. A method for preparing diethyl-alpha-sulfopalmitate, comprising reacting alpha-sulfopalmitic acid with at least 2 moles of ethylene per mole of sulfopalmitic acid in the presence of 0.5 to 1.0 mole of boron trifluoride per mole of sulfopalmitic acid under pressures of 500 to 600 p.s.i., at temperatures of 10 to 50° C., for from 4 to 8 hours, and recovering the ester.

11. A method for preparing diethyl-alpha-sulfostearate, comprising reacting alpha-sulfostearic acid with at least 2 moles of ethylene per mole of sulfostearic acid in the presence of about 0.5 to 1.0 mole of boron trifluoride per mole of sulfostearic acid under pressures of from 500 to 600 p.s.i., at temperatures of from 10 to 50° C., for about 4 to 8 hours, and recovering the ester.

References Cited in the file of this patent
UNITED STATES PATENTS

| | | |
|---|---|---|
| 1,974,007 | Bertsch | Sept. 18, 1954 |
| 2,665,243 | Johnson et al. | Jan. 5, 1954 |

OTHER REFERENCES

Martin: "Boron Trifluoride and Its Derivatives," 1949, pages 187, 188.

Manzelius: Ber. Deut. Chem. 21, 1550–1552 (1888).

Van Charante: Rec. Trav. Chim. 24, 60–104 (1905), especially page 79.

Weil et al.: J. Physical Chemistry 60, 899–901 (1956).